(12) United States Patent
Miyata et al.

(10) Patent No.: US 7,972,736 B2
(45) Date of Patent: Jul. 5, 2011

(54) FUEL CELL SYSTEM WITH WARMING-UP AND METHOD OF OPERATING THE SAME

(75) Inventors: Koichiro Miyata, Wako (JP); Chihiro Wake, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1155 days.

(21) Appl. No.: 11/712,985

(22) Filed: Mar. 2, 2007

(65) Prior Publication Data
US 2007/0207356 A1   Sep. 6, 2007

(30) Foreign Application Priority Data
Mar. 3, 2006   (JP) ................ 2006-058255

(51) Int. Cl.
*H01M 8/04* (2006.01)
(52) U.S. Cl. ......... 429/432; 429/430; 429/433; 429/436
(58) Field of Classification Search ............... 429/12, 429/22, 23, 433, 434, 436, 432, 430
See application file for complete search history.

(56) References Cited

U.S. PATENT DOCUMENTS

| 7,335,435 B2 * | 2/2008 | Yamada | 429/436 |
| 7,479,337 B2 * | 1/2009 | Goebel | 429/17 |
| 7,615,299 B2 * | 11/2009 | MacBain et al. | 429/26 |

FOREIGN PATENT DOCUMENTS
JP   7-94202 A   4/1995

* cited by examiner

*Primary Examiner* — Patrick Joseph Ryan
*Assistant Examiner* — Julian Mercado
(74) *Attorney, Agent, or Firm* — Westerman, Hattori, Daniels & Adrian, LLP

(57) ABSTRACT

In a fuel cell system including a fuel cell supplied with reaction gases for generating an electric power, and a combustion heater supplied with the reaction gases for heating the fuel cell during warming-up, an electric discharging circuit is provided to discharge an electric current from the fuel cell supplied with the reaction gases to decrease a voltage difference applied to the membrane sandwiched between the anode and cathode during the warming-up. The combustion heater is connected in series or in parallel with the fuel cell system.

7 Claims, 4 Drawing Sheets

FUEL CELL SYSTEM WITH WARMING-UP AND METHOD OF OPERATING THE SAME

CROSS REFERENCE TO RELATED APPLICATION

The present application claims benefit of the filing date of Japanese patent application No. 2006-058255 filed on Mar. 3, 2006, which is incorporated herein by reference.

FIELD OF THE INVENTION

The present invention relates to a fuel cell system with warming-up and a method of operating the same.

DESCRIPTION OF THE RELATED ART

Fuel cells have high energy conversion efficiencies. In other words, the fuel cell has a low capacity of warming up itself by heat loss in generating a power. If a temperature of the fuel cell is lower than a specific temperature, a power generation efficiency of the fuel cell becomes extremely low. For this reason, it is difficult to generate a sufficient power immediately after start-up. In addition, under such a low temperature that a part of the electrolyte membrane of a cell freezes, the power generation efficiency further decreases. To overcome such a low temperature problem, various warming-up systems for the fuel cell have been proposed. For example, a combustion heater is provided in a coolant circulation system for heating or cooling the fuel cell and is supplied with a fuel from a fuel source shared by the fuel cell (See Japanese Laid-open Patent Application Publication No. 7-94202 at paragraph 0073 and FIG. 11).

SUMMARY OF THE INVENTION

A first aspect of the present invention provides a fuel cell system comprising: a fuel cell, including an anode supplied with a fuel gas, a cathode supplied with an oxidant gas, and a membrane which is sandwiched between the anode and the cathode, for generating an electric power; a combustion heater for reacting the fuel gas with the oxidant gas to generate a heat to warm up the fuel cell; a reaction gas supplying device for supplying reaction gases including the fuel gas and the oxidant gas to the fuel cell and the combustion heater during warming-up; and an electric discharging circuit for discharging an electric current from the fuel cell to keep a generated voltage between the anode and the cathode equal to or lower than a predetermined voltage corresponding to a withstanding voltage of the membrane before the warming-up is completed.

Preferably, the fuel cell system according to the first aspect prevents the membrane from being deteriorated due to a high voltage difference state during the warming-up because the fuel cell is discharged to prevent the voltage difference between the anode and the cathode from exceeding a predetermined threshold voltage determined in consideration of deterioration of the membrane during the warming-up.

A second aspect of the present invention provides the fuel cell system based on the first aspect, wherein the electronic discharging circuit supplies the electric current to a load of the fuel cell system.

According to the second aspect of the present invention, an energy efficiency can be increased because an energy loss is reduced by supplying the electric power from the fuel cell to the load of the fuel cell system.

A third aspect of the present invention provides a method of operating a fuel cell system comprising: a fuel cell, including an anode supplied with a fuel gas, a cathode supplied with an oxidant gas, and a membrane which is sandwiched between the anode and the cathode, for generating an electric power; a combustion heater for reacting the fuel gas with the oxidant gas to generate a heat to warm up the fuel cell; a reaction gas supplying device for supplying reaction gases including the fuel gas and the oxidant gas to the fuel cell and the combustion heater during warming-up, the method comprising the steps of: operating the combustion heater to warm up the fuel cell; and discharging a current from the fuel cell to keep a generated voltage between the anode and the cathode equal to or lower than a predetermined voltage corresponding to a voltage withstanding voltage of the membrane before the warming-up is completed.

The method according to the third aspect may prevent the membrane from being deteriorated due to a high voltage difference state during the warming-up because the fuel cell is discharged to prevent the voltage difference between the anode and the cathode from exceeding a predetermined threshold voltage determined in consideration of the deterioration of the membrane during the warming-up.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Prior to describing an embodiment of the present invention, the above-mentioned related art will be further explained.

In the fuel cell system including the combustion heater as mentioned above which generates the electric power after warming-up, it is preferable that the fuel gas is supplied also to the fuel cell while the fuel is supplied to the combustion heater. For example, it is preferable that the fuel is supplied via the combustion heater to the fuel cell or supplied to the fuel cell in addition to the combustion heater. This is because the fuel cell is supplied with the fuel gas before completion of the warming-up, so that the power generation can be immediately started. In addition, the fuel cell may be supplied with a fuel gas during the warming-up for other reasons.

However, if the fuel (fuel gas and oxidant gas) is supplied to the fuel cell during the warming-up, although the fuel is not consumed in the power generation, the electrodes in the fuel cell become at high potentials. If the high potential state continues long, or if the high potential state is made whenever the warming-up is performed, the performance of the fuel cell deteriorates.

The present invention provides a fuel cell and a method of operating the same capable of preventing decrease in performance of the fuel cell due to the warming-up operation.

With reference to drawings will be described in details embodiments of the present invention.

The same elements shown in a plurality of drawings are designated with the same references.

First Embodiment

Figure 1:
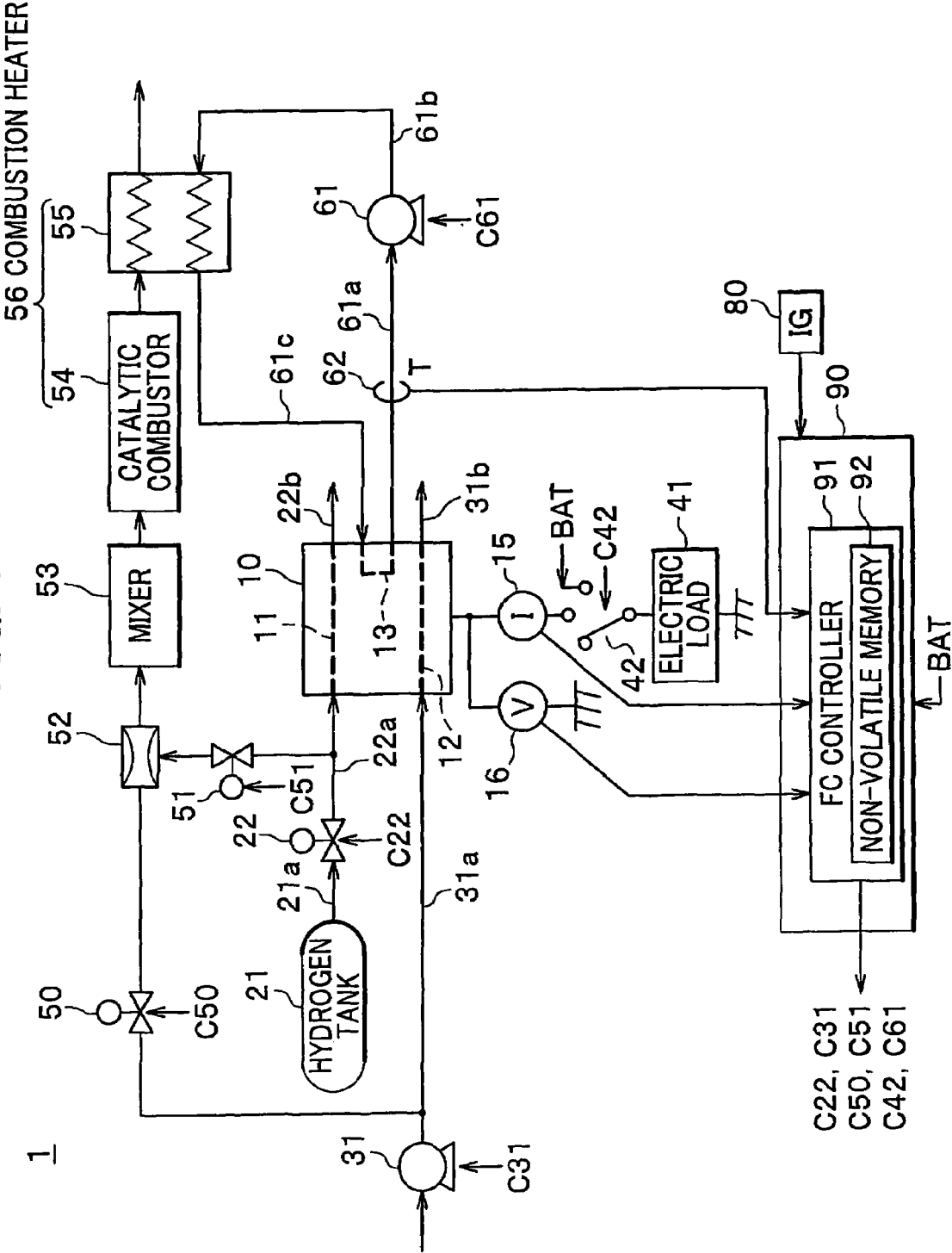
FIG. 1 is a block diagram of a fuel cell system according to a first embodiment of the present invention.

FIG. 1 is a block diagram of a fuel cell system with warming-up according to a first embodiment. In the fuel cell system of the present invention, a fuel cell mounted on a vehicle is exemplified. However, it is not always mounted on the vehicle.

In FIG. 1, the fuel cell system 1 according to the first embodiment mainly includes a fuel cell 10 including an anode (not shown), a cathode (not shown), and an electrolyte membrane (not shown) sandwiched between the anode and the cathode for generating a power from supplied fuel gas and oxidant gas, an anode system (mentioned later) for supplying hydrogen as the fuel gas (a reaction gas) to and exhausting the same from the anode of the fuel cell 10, a cathode system (mentioned later) for supplying air containing oxygen as the oxidant gas (a reaction gas) to and exhausting the same from the cathode, a warming-up system (mentioned later) for warming-up the fuel cell system, an ignition switch (IG) 80 for starting the fuel cell system, and an ECU (Electronic Control Unit) 90.

The fuel cell 10 is provided by stacking single cells, each being of a solid polymer electrolyte membrane type. More specifically, the single cell includes a membrane electrode assembly (MEA) and a pair of separators sandwiching the MEA therebetween. Each separator has channels for supplying hydrogen and oxygen all over the MEA and through holes and the like for introducing hydrogen and oxygen to all single cells. The channels and the through holes and the like serve as an anode fluid passage 11 and a cathode fluid passage 12.

When each anode is supplied with hydrogen through the anode fluid passage 11 and each cathode is supplied with air containing oxygen through the cathode fluid passage 12, on catalyst such as Pt included in the anode and the cathode an electrochemical reaction occurs which generates a potential difference (so-called OCV (Open Circuit Voltage)). When the fuel cell 10 in which the potential difference is generated in each single cell is connected to an electric load 41 such as a drive motor (not shown), the fuel cell continuously generates the electric power. In addition, in the separator, a heat exchanging fluid passage 13 is formed for allowing a heat exchanging fluid to flow therethrough to heat the fuel cell 10.

The anode system includes a hydrogen tank 21 for storing hydrogen, a shutoff valve 22 for opening and shutting off a fluid passage for hydrogen gas from the hydrogen tank 21. The hydrogen tank 21 is connected, on a downstream side thereof, to a pipe 21a, to the shutoff valve 22, a pipe 22a, and the anode fluid passage 11 in this order. When the shutoff valve 22 is opened by a FC (fuel cell) controller 91 (mentioned later), hydrogen is supplied to the anode fluid passage 11. In the pipe 22a, a regulation valve (not shown) is provided which reduces a pressure of the hydrogen gas to a suitable pressure.

The anode fluid passage 11 is connected, on a downstream side thereof, to a pipe 22b to exhaust an anode-off gas exhausted from the anode to the external through the pipe 22b.

The cathode system mainly includes a compressor (supercharger) 31 as an oxidant gas supply source. The compressor 31 is connected to a cathode fluid passage 12 through a pipe 31a and thus supplies air containing oxygen to the cathode fluid passage 12 when operating in response to a control signal C31 from the FC controller 91. Further, in the pipe 31a, a humidifier (not shown) is provided to adequately humidify the air supplied to the cathode.

The cathode fluid passage 12 is connected, on a downstream side thereof, to a pipe 31b which exhausts a cathode-off gas exhausted from the cathode to the external through the pipe 31b.

The fuel cell 10 is connected to a voltage sensor 16 for measuring an output voltage of the fuel cell 10 and to a series circuit including a current sensor 15 for measuring an output current I of the fuel cell 10, a load 41 operating with the electric power from the fuel cell 10, and a switch 42 for supplying and cutting off a supply power to the load 41. In FIG. 1, though only a pair of the load 41 and the switch 42 are shown, actually, a plurality of series circuits each including a pair of the load 41 and the switch 42 are connected in parallel to this series circuit in which the switches 42 are selectively operated. The loads 41 include the compressor 31 and a motor of a pump 61 in addition to the drive motor (not shown) for driving wheels of the vehicle.

The warming-up system is provided to appropriately heat the heat exchanging fluid flowing through the heat exchanging fluid passage 13 of the fuel cell 10. The warming-up system includes a bypass shutoff valve 50 connected to a branch from the pipe 31a extending from the compressor 31, a shutoff valve 51 connected to a branch from the pipe 22a provided downstream from the shutoff valve 22, an injector 52 for injecting the hydrogen gas coming from the shutoff valve 51 into an air flow coming from the bypass shutoff valve 50, a mixer 53 for mixing the air passing through the injector 52 with the hydrogen gas to generate a mixture gas for combustion, a catalytic combustor 54 containing a catalyst such as Pt for causing a combustion mixture gas to generate a high temperature exhaust gas, a heat exchanger 55 for exchanging heat between the high temperature exhaust gas supplied from the catalytic combustor 54 with the heat exchanging fluid to heat the heat exchanging fluid, the pump 61 for allowing the heat exchanging fluid heated by the heat exchanger 55 to flow through the heat exchanging fluid passage of the fuel cell 10 to circulate the heat exchanging fluid, and pipes 61a to 61c for the heat exchanging fluid.

The catalytic combustor 54 and the heat exchanger 55 operate as a combustion heater 56. The exhaust gas after heat exchanging is exhausted to the external through a pipe. The pipe 61a is provided with a temperature sensor 62 for detecting a temperature of the heat exchanging fluid flowing therein. Since the heat exchanging fluid flows through the pipe 61a immediately after being exhausted from the fuel cell 10, a temperature T is regarded as a temperature approximately equal to the temperature of the fuel cell 10. The heat exchanging fluid is a so-called radiator fluid (antifreeze liquid, coolant) which mainly contains, for example, ethylene glycol.

The ECU 90 performs electronic control for the vehicle (not shown) mounting the fuel cell 1 according to the embodiments of the present invention and includes controllers (not shown) in addition to the FC controller 91. The controllers including the FC controller 91 each have as well known, a CPU (a Central Processing Unit not shown), a non-volatile memory 92, a RAM (Random Access Memory), various interface circuits, and other electronic circuits. The controllers in the ECU 90 are mutually connected to each other to exchange necessary information to perform electronic control for the vehicle (not shown).

The FC controller 91, as described below, conducts a fuel cell (FC) control program (not shown) stored in the non-volatile memory 92 using the CPU to output control signals C22, C31, C50, C51, C42, and C61 for controlling the shutoff valve 22, the compressor 31, the shutoff valves 50 and 51, the switch 42, the pump 61, respectively, in response to the signals from the current sensor 15, the voltage sensor 16, the temperature sensor 62, and the ignition switch (IF) 80.

Figure 2:
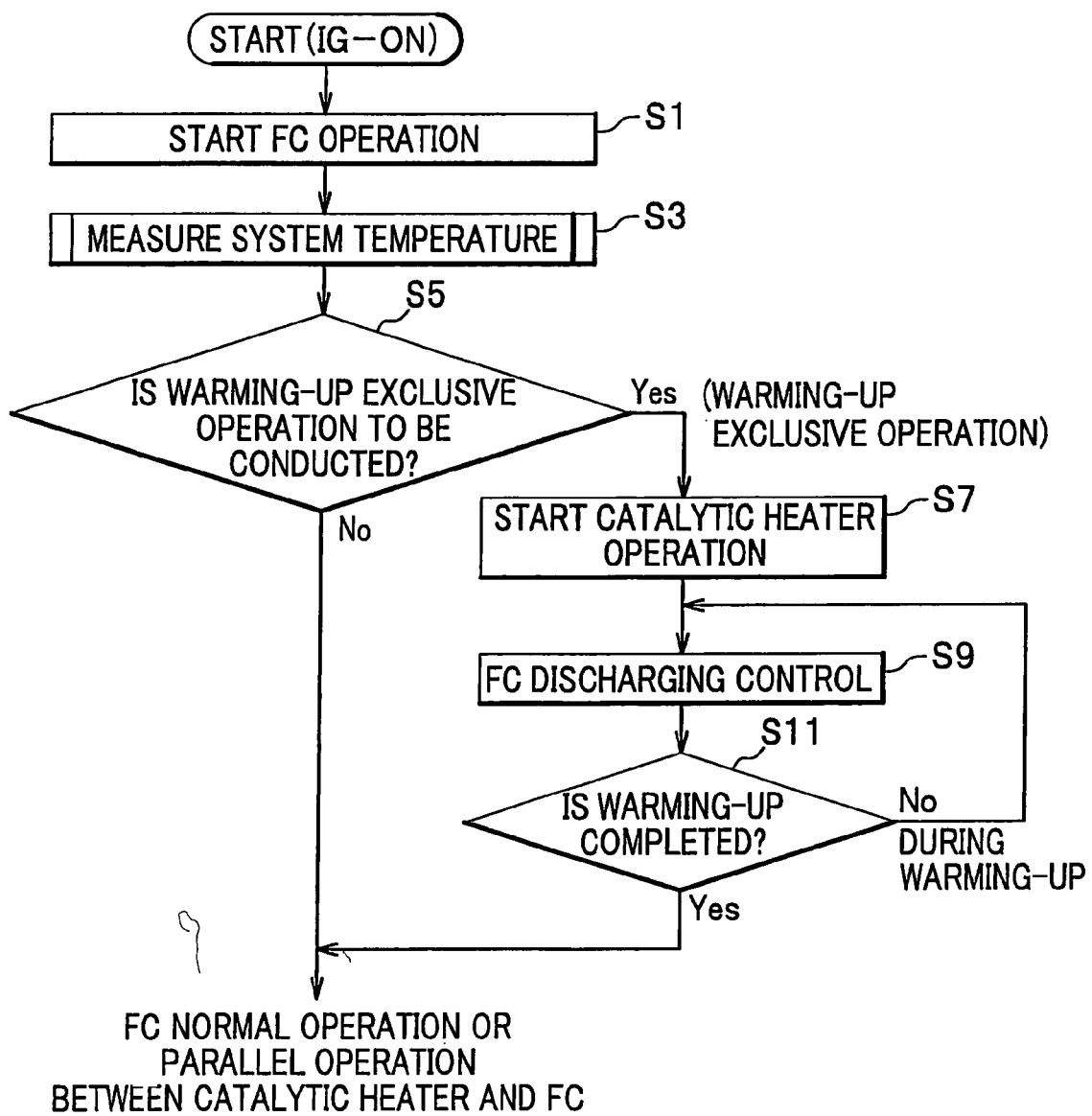
FIG. 2 shows a flowchart illustrating a flow of a fuel cell control program executed by a fuel controller in the fuel cell.

FIG. 2 shows a flowchart illustrating a flow of a process by the FC control program according to the first embodiment read out from the non-volatile memory 92 in the FC controller 91 when the ignition switch 80 is turned on. The FC control program has a function for a warming-up exclusive mode without permitting the driver to drive the vehicle in a predetermined condition. An initial status is assumed that all shutoff valves 22, 50, and 51 are closed when the ignition switch is set to OFF, and immediately after turning ON of the ignition switch 80, the switch 42 is set to OFF (open), and the compressor 31 and the pump 61 are set to OFF. When the ignition switch 80 is turned ON, the FC controller 91, as shown in FIG. 2, operates only the compressor 31 and the shutoff valve 22 in a step S1, to supply predetermined quantities of the air and the hydrogen into the fuel cell 10 to operate the fuel cell 10. After this, the FC controller 91 measures the temperature T of the fuel cell 10 (hereinafter referred to as a system temperature T) in a status in which the output electrodes of the fuel cell 10 are opened.

In a step S5, the FC controller 91 determines whether or not to conduct a warming-up exclusive operation on the basis of the system temperature T measured in the step S3. More specifically, the FC controller 91 determines whether the system temperature T is lower than a predetermined temperature T0. In the step S5, when the FC controller 91 determines that the warming-up exclusive operation is unnecessary because T>T0 (No), it is allowed that the FC controller 91 conducts either a normal operation of the fuel cell 10 in a general manner or the normal operation after a parallel operation between the fuel cell 10 and the combustion heater 56 for a time interval required.

Figure 3:
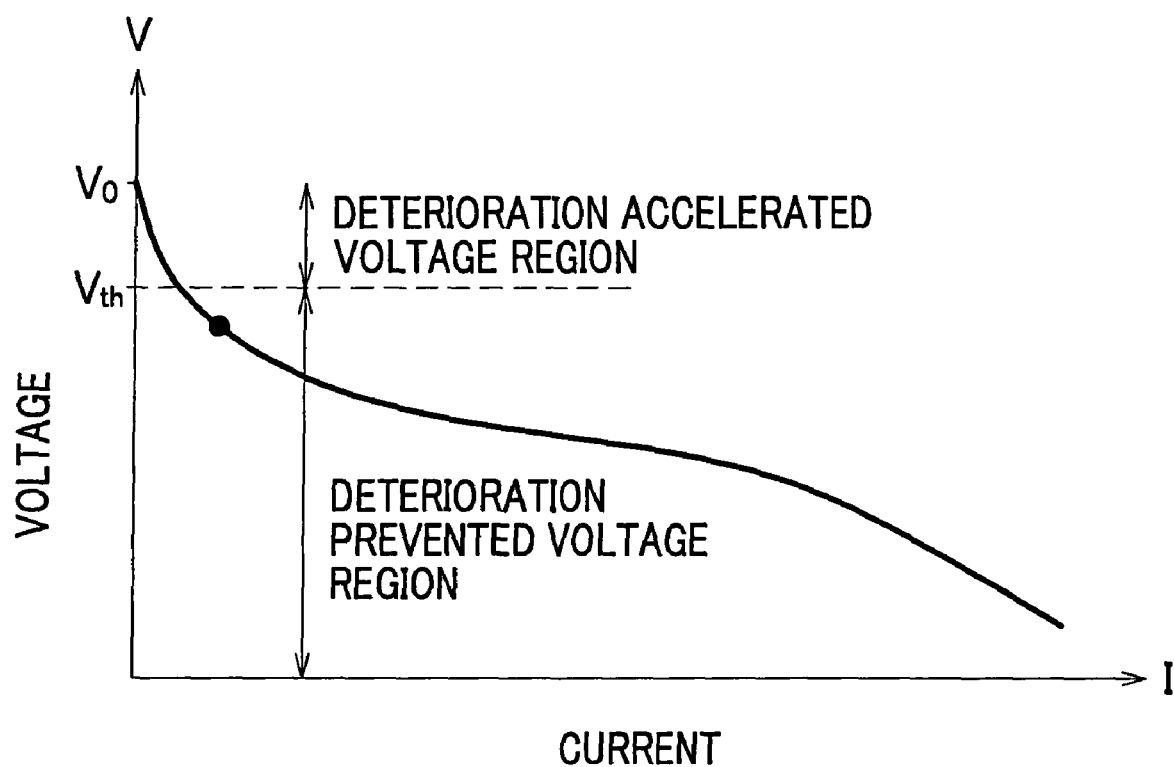
FIG. 3 shows a current to voltage chart of the fuel cell system according to the first embodiment and a second embodiment.

In the step S5, when determining that the warming-up exclusive operation should be conducted because T≦T0 (Yes), the FC controller 91 performs the warming-up exclusive operation to rapidly increase the system temperature T of the fuel cell 10 to allow the fuel cell 10 to be started in a short time interval by suppressing the operation of the fuel cell 10. For this purpose, the FC controller 91 starts in a step S7 operating the combustion heater 56 by opening the shutoff valves 22, 50, and 51, and operating the pump 61 shown in FIG. 1. In this event, to increase a warming-up efficiency such a control is preferable that quantities or flow rates of the reaction gases supplied to the combustion heater 56 is higher than that of the reaction gases supplied to fuel cell 10. However, because the fuel cell 10 is also supplied with the reaction gases, the fuel cell 10 generates an electric power (a voltage difference is developed by the electrochemical reaction). FIG. 3 is a chart indicating an example of a current-voltage (I-V) curve of the fuel cell 10 under a condition requiring the warming-up operation in the warming-up exclusive mode. As shown in the chart in FIG. 3, when the fuel cell 10 is not connected to any load, the current is zero, so that the output voltage V of the fuel cell 10 becomes an open circuit voltage Vo which is relatively high. When the fuel cell 10 is kept in such a high voltage status, the MEA of the fuel cell 10 deteriorates. Thus, it is important to keep the output voltage V of the fuel cell 10 lower than a threshold voltage Vth causing almost no problem with deterioration of the MEA (not shown) even though the MEA undergoes the output voltage for a long time. Accordingly, it is necessary to prevent the voltage between both electrodes of the MEA from exceeding the withstanding voltage of the electrolyte membrane in the MEA. Thus, for example, the threshold voltage Vth may be determined on the basis of the withstanding voltage of the electrolyte membrane.

Thus, the FC controller 91 operates, in step S9, the switch 42 to make a connection to the load 41 having such a resistance as to keep the output voltage V of the fuel cell 10 equal to or lower than the threshold voltage Vth. In this case, as shown in the I-V curve in FIG. 3, in the vicinity of the current I=0, a voltage drop rate in a low load region is relatively large, so that only drawing a relatively small current from the fuel cell 10 can decrease the output voltage V to the threshold voltage Vth. It is not always necessary to prepare a special load for this purpose as the load 41, but any electric device having such a suitable resistance (any electric operating elements other than the drive motor (not shown). To select one or more electric device, the voltage differences between the actual open circuit voltages Vo and the threshold voltage Vth and electric devices having resistances necessary for substantially eliminating the voltage difference related to the voltage differences are recorded (including names of electric devices) as data, for example, in a form of a table in the non-volatile memory 92. One of electric devices having a resistance necessary for eliminating the difference is selected as the load 41 on the basis on the data. In this step, a plurality of electric devices may be integrally used to have a necessary resistance corresponding to the voltage difference.

In addition, drawing a current from the fuel cell 10 under an insufficient warming-up status may cause a trouble in the fuel cell 10 for a reason different from the reason that the fuel cell 10 is placed in the high voltage potential status for long time. For this reason and for increasing the warming-up efficiency, it is preferable to set the output voltage V of the fuel cell 10 to a high voltage to such an extent that the output voltage V of the fuel cell 10 does not exceed the threshold voltage Vth. More specifically, it is preferable to repeat the measurement of the output voltage V of the fuel cell 10 and turning ON and OFF the electric device to have as (Vth−V) a positive value as small as possible.

In addition, instead of consuming the electric power by connecting the load 41 such as the electric device, a storage battery (not shown) may be charged. This can increase energy efficiency.

In the next step S11, the FC controller 91 determines, in a step S11, whether or not the warming-up has been completed. The determination that the warming-up has been completed can be made in accordance with, for example, whether or not the system temperature T exceeds the predetermined temperature T0. For example, if T≦T0, the FC controller 91 determines that the warming-up has not been completed (No), returning to the step S9. If T>T0 (Yes), the FC controller 91 determines that the warming-up has been completed, and thus can perform either the normal operation of the fuel cell 10 or the normal operation after the parallel operation between the fuel cell 10 and the combustion heater 56 for a necessary interval.

As described above, according to the first embodiment of the present invention, also in the case that the warming-up is performed in which the use of the fuel cell 10 is suppressed as much as possible (in the case that the power generations is performed after completion of the warming-up), deterioration in performance of the fuel cell 10 can be prevented by keeping the output voltage of the fuel cell 10 equal to or lower than the threshold voltage Vth which prevents the fuel cell 10 from being deteriorated in performance. In addition, because the current drawn to decrease the output voltage of the fuel cell 10 is supplied to the electronic device or the storage battery BAT, the energy efficiency can be further increased.

Further, because being always supplied with the fuel gas and the oxidant gas, the fuel cell 10 in the warming-up exclusive mode can start the power generation immediately after the completion of the warming-up.

Second Embodiment

In the first embodiment, the fuel cell system having a parallel configuration regarding a reaction gas supplying system between the fuel cell 10 and the combustion heater 56 is exemplified. However, the present invention is applicable to a fuel cell system having a series configuration regarding the reaction gas supplying system.

Figure 4:
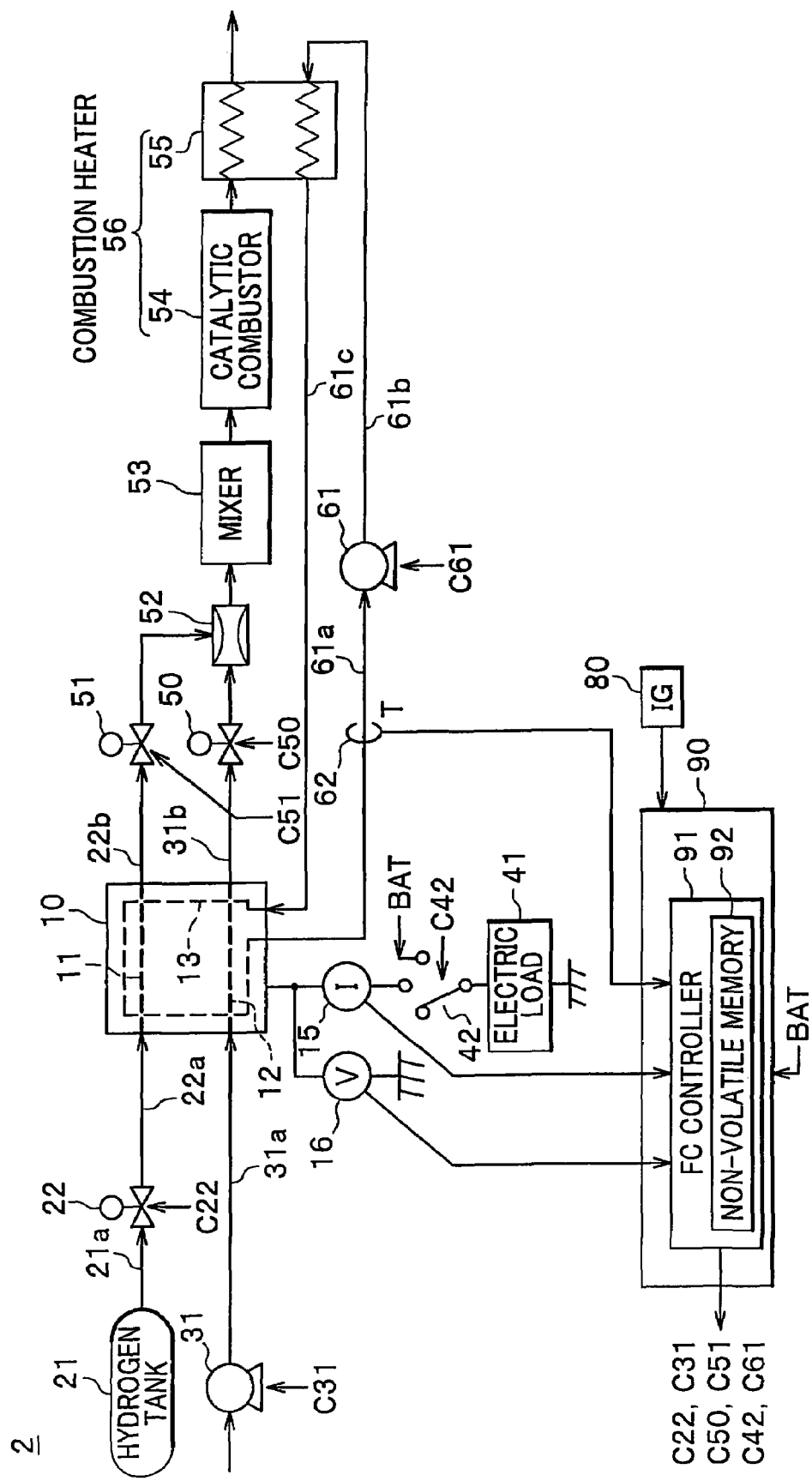
FIG. 4 is a block diagram of a fuel cell system according to the second embodiment of the present invention.

FIG. 4 is a block diagram of a fuel cell system 2 having the series configuration regarding the reaction gas supplying system according to a second embodiment of the present invention. The fuel cell system shown in FIG. 4 is substantially the same as the fuel cell system 1 shown in FIG. 1 except that the fuel cell 10 is connected to the combustion heater 56 in series. More specifically, the shutoff valve 51 is connected to the pipe 22b downstream from the anode fluid passage 11, and the shutoff valve 50 and the injector 52 are connected to the pipe 31b downstream from the cathode fluid passage 12 of the fuel cell 10.

A fuel cell control program executed when the ignition switch 80 is turned ON is similar to that for the fuel cell system 1 shown in FIG. 1, and thus the description thereof is omitted. In addition, the modifications described in the first embodiment are applicable to the fuel cell system 2 shown in FIG. 4.

[Modifications]

Modifications will be described.

In the first and second embodiments shown in FIGS. 1 and 4, respectively, the system temperature T is measured on the pipe 61a downstream from the heat exchanging fluid passage 13 of the fuel cell 10. However, the system temperature T may be determined by measuring the anode-off gas exhausted from the anode fluid passage 11 of the fuel cell 10.

In FIGS. 1 and 4, elements having no direct relation with the present invention are omitted. However, other elements may be further used if necessary. For example, the anode system is provided with a circulation fluid passage (not shown) for returning the hydrogen gas exhausted from the fuel cell 10 to a hydrogen supply fluid passage of the fuel cell 10 and a purge valve (not shown) for purging the hydrogen gas from the circulation fluid passage. In this respect, in the second embodiment shown in FIG. 4, the hydrogen gas exhausted from the purge valve is supplied to the combustion heater 56.

In the embodiments described above the present invention is applied to a vehicle. However, the present invention is, without limiting to the vehicle, applicable to other uses in which the fuel source is shared by the fuel cell 10 and the combustion heater 56, for example, a ship.

According to the present invention, the fuel cell can be warmed-up without deterioration in the fuel cell in which the fuel cell is operated as less as possible.

In addition, in the first and second embodiments, an electronic discharging circuit as the switch 42 may supply the current to a plurality of the loads of the fuel cell having a plurality of current consumptions. In the step S9, the FC controller 91 successively starts supplying the current to the electric devices and measures the output voltage after connection by the voltage sensor 16 until the voltage difference measured by the voltage sensor 16 becomes a positive value within a predetermined value or equal to or smaller than the threshold voltage Vth. The order of supplying the current is preset as priority, but the priority may be changed in response to a request or a sensor signal.

Further, the ECU 90 is supplied with a power from the storage battery BAT (not shown) to be operated before the start-up of the fuel cell. The power to the ECU 90 may be supplied via the ignition switch 80. In the case of the compressor 31, the pump 61, and the like requiring start-up operations in the fuel cell system, in addition to an open position (a left position in FIGS. 1 and 4) and an electric device connection position (a middle position in FIGS. 1 and 4), the switch 42 has a battery position (a right position in FIGS. 1 and 4) to supply the electric power from the battery BAT (not shown) to the compressor 31 and the pump 61 before the start-up of the fuel cell systems 1 and 2. The power may be supplied from the fuel cell system after the start-up.

The invention claimed is:

1. A fuel cell system, comprising:
a fuel cell, including an anode supplied with a fuel gas, a cathode supplied with an oxidant gas, and a membrane which is sandwiched between the anode and the cathode, for generating an electric power;
a combustion heater for reacting the fuel gas with the oxidant gas to generate a heat to warm up the fuel cell, the combustion heater having an exhaust pipe exhausting combustion gases external to the fuel cell;
a heat exchanging fluid passage having heat exchange liquid therein, the heat exchanging fluid passage connecting the combustion heater to the fuel cell, such that the heat exchange liquid transfers heat from the combustion heater to the fuel cell during warming-up;
a reaction gas supplying device for supplying reaction gases, including the fuel gas and the oxidant gas, to the fuel cell and the combustion heater, in parallel, during warming-up; and
an electric discharging circuit for discharging an electric current from the fuel cell to keep a generated voltage between the anode and the cathode equal to or lower than a predetermined voltage corresponding to a withstanding voltage of the membrane before the warming-up is completed.

2. The fuel cell system as claimed in claim 1, wherein the electronic discharging circuit supplies the electric current to a load of the fuel cell system.

3. The fuel cell system as claimed in claim 2, wherein the fuel cell system includes an electric device for the fuel cell as the load.

4. The fuel cell system as claimed in claim 2, wherein the electronic discharging circuit supplies the current to a plurality of loads of the fuel cell system, and the electric discharging circuit has a table storing current consumptions of the loads related with the loads, respectively and selects at least one of the loads to be supplied with the current on the basis of the current consumptions of the loads.

5. The fuel cell system as claimed in claim 1, wherein quantities of the reaction gases supplied to the fuel cell are higher than those of the reaction gases to the combustion heater.

6. The fuel cell system as claimed in claim 1, wherein the electric discharging circuit discharges the electric current to decrease a difference of the voltage difference from the predetermined voltage towards zero, but to have a positive value.

7. A method of operating a fuel cell system comprising:
a fuel cell, including an anode supplied with a fuel gas, a cathode supplied with an oxidant gas, and a membrane which is sandwiched between the anode and the cathode, for generating an electric power;

a combustion heater for reacting the fuel gas with the oxidant gas to generate a heat to warm up the fuel cell, the combustion heater having an exhaust pipe exhausting combustion gases external to the fuel cell;

an electric discharging circuit for discharging an electric current from the fuel cell;

a heat exchanging fluid passage having heat exchange liquid therein, the heat exchanging fluid passage connecting the combustion heater to the fuel cell, such that the heat exchange liquid transfers heat from the combustion heater to the fuel cell during warming-up;

a reaction gas supplying device for supplying reaction gases, including the fuel gas and the oxidant gas, to the fuel cell and the combustion heater, in parallel, during warming-up, the method comprising the steps of:

operating the combustion heater to warm up the fuel cell; and discharging a current from the fuel cell, by way of the electric discharging circuit, to keep a generated voltage between the anode and the cathode equal to or lower than a predetermined voltage corresponding to a withstanding voltage of the membrane before the warming-up is completed.

* * * * *